United States Patent [19]
Jackson et al.

[11] 3,709,263
[45] Jan. 9, 1973

[54] WOVEN FABRIC FOR NURSERY PLANT ROOT BALLS

[75] Inventors: Charles A. Jackson, Stirling, N.J.; Martin B. Katz, La Due, Mo.

[73] Assignee: Thiokol Chemical Corporation

[22] Filed: Sept. 8, 1970

[21] Appl. No.: 70,262

[52] U.S. Cl. .................................... 139/420, 47/37
[51] Int. Cl. ......................... D03d 15/00, A01q 9/10
[58] Field of Search ............. 139/420, 383, 426, 389; 28/76 T; 57/140, 140 J; 47/32, 31

[56] References Cited

UNITED STATES PATENTS

| | | |
|---|---|---|
| 3,375,607 | 4/1968 | Melvold .................................. 47/37 |
| 3,415,012 | 12/1968 | Stubbmann ............................ 47/37 |
| 3,482,609 | 12/1969 | Neckerman .......................... 139/383 |
| 3,439,865 | 4/1969 | Port et al. ........................ 139/389 X |
| 3,470,928 | 10/1969 | Schwartz ........................ 139/420 X |
| 3,544,404 | 12/1970 | Johnson et al. ................. 139/389 X |
| 3,033,239 | 5/1962 | Kenin ............................. 139/420 X |
| 2,365,315 | 12/1944 | Williams ............................ 28/76 T |

FOREIGN PATENTS OR APPLICATIONS

| | | |
|---|---|---|
| 1,186,730 | 4/1970 | Great Britain ........................... 47/37 |
| 1,908,392 | 9/1970 | Germany ................................. 47/37 |
| 660,255 | 2/1964 | Italy ..................................... 28/76 T |
| 877,542 | 9/1961 | Great Britain | 
| 1,559,879 | 2/1969 | France ................................. 139/420 |

*Primary Examiner*—James Kee Chi
*Attorney*—Thomas W. Brennan

[57] ABSTRACT

A fabric woven of polyolefin ribbons is used for "balling" or wrapping the roots of plants and trees and the like. The fabric of the invention comprises a woven material having a set, or series of deteriorable strips or yarns woven in at pre-selected intervals, to provide spaces or "windows" for passage of the roots to the fabric and into the surrounding soil.

6 Claims, 1 Drawing Figure

PATENTED JAN 9 1973
3,709,263
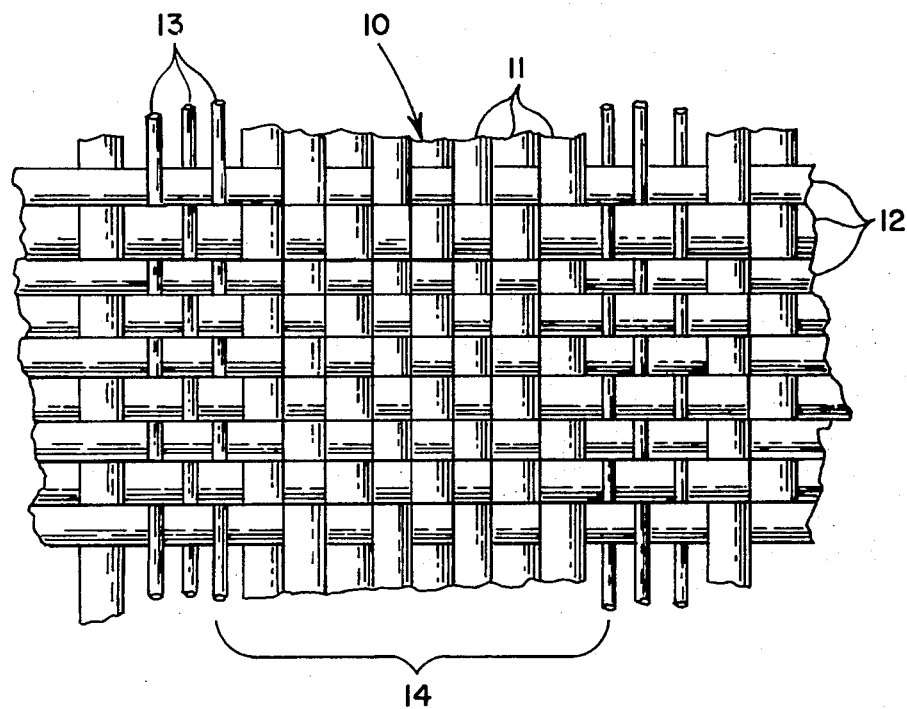
Martin B. Katz
Charles A. Jackson
INVENTOR.
BY Thomas W. Brennan 3,709,263

WOVEN FABRIC FOR NURSERY PLANT ROOT BALLS

BACKGROUND OF THE INVENTION

The present invention relates to woven fabrics for balling or wrapping plant roots and the like. More particularly, it refers to fabrics woven from yarns of material relatively impervious to chemical or biological organisms found in most types of soil which is modified by weaving into its fabric mesh spaced apart strips of biodegradable or deteriorable yarns. Such yarns when contacted by the soil in which the fabric wrapped plant root is placed will rot or otherwise deteriorate to provide spaces or "windows" for the roots to penetrate and enter the surrounding soil.

Prior art fabrics in use are well represented by the so-called burlap or jute bag. This fabric is also a woven fabric and contains the root and the necessary soil complement thereto. However nursery artisans are sometimes subjected to unwanted extra expense when using this fabric since it rots even when stored in nurseries above ground over long periods of time. Other fabrics both woven and non-woven have found limited use in plant balling and wrapping, but have been found wanting in one or more ways. For instance, as noted above the jute wrapping is subject to moisture deterioration as well as to attack by the organisms and chemical materials always present in the soil surrounding the roots within the ball. Synthetic products woven or unwoven have found limited use for balling or wrapping nursery plants but have been found wanting because of their inability to permit the plant roots to penetrate therethrough and enter the surrounding soil. Other synthetic fabrics suffer from many of the same defects as jute when used in this application and therefore have not been extensively used.

SUMMARY OF THE INVENTION

Accordingly, it is an object of this invention to provide a woven synthetic fabric useful as a nursery plant wrapping which is modified to permit penetration thereof by the roots within the wrapping when said nursery plant or tree is placed in the ground.

A still further object is to provide a woven fabric of the character referred to wherein strips, or yarns of deteriorable material are woven into the fabric at spaced apart intervals thereby providing "windows" for passage therethrough of the roots within the wrapping.

A still further object of this invention is to provide a nursery wrap or ball material woven of polyolefin ribbons to form a closely woven fabric and in which are woven a series, or set of strips of yarns of degradable material such as paper or jute and the like, and which, when placed in the soil, gradually rots away to provide necessary spaces or "windows" for the roots of the plant to pass through and into the surrounding soil.

The invention herein therefore resides in certain novel constructions for wrappings, or "balls", for the roots of plants and trees and the like wherein long term storage above ground in nurseries prior to planting is easily and economically accomplished. Other objects and novel characteristics and advantages of the present invention will become more apparent from the following detailed description and accompanying drawing in which:

the single FIGURE is a plan view of a portion of the fabric of the invention and is illustrative of the inventive concept.

DESCRIPTION OF THE INVENTION

Referring to the drawing there is shown in its preferred embodiment a portion of a fabric 10 having warp yarns 11 of ribbon-like form and having a substantially rectangular cross-section. The ribbons are preferably made of a polyolefin material such as polypropylene or polyethylene. Woven with warp yarns 11 are fill yarns 12 of similar form and made from a similar material. Interspersed within the fabric 10 is a set, or series of warp yarns 13 being substantially round in cross-section, although the cross-sectional shape of these yarns is a matter really of convenience and therefore, of no particular consequence with respect to operation of the invention.

Yarns 13 are spaced apart at intervals 14 as shown in the drawing, intervals 14 being a distance of from about 1 inch to about 8 or even 10 inches, depending upon the end use of fabric 10. In a slightly altered embodiment warp yarns 11 can all be made of material similar to that of yarns 13, as for example, when fabric 10 is intended to be used for a ball or wrapping material for larger plants and trees having rapid growth. Thus, in this instance as strips 13 rot or decay due to the chemical or biological action of the soil in which the plant or tree is planted, the roots are provided with larger openings and can more readily penetrate the soil for proper nourishment and growth. However, in most instances, intervals 14 of soil degradable yarns 13 in accordance with the above mentioned distances will suffice in the practical application of this invention.

Soil degradable or deteriorable strips 13 made from material such as well known jute or burlap, treated or untreated, treated cotton, paper, synthetics such as rayon, certain polyvinyl alcohol polymeric substances such as slit films thereof, are all within the purview of the present invention. Obviously, any material which is degradable under the action of soil and capable of being formed into yarns for weaving can be utilized and are also contemplated as being within the scope of this invention.

As herein above mentioned warp yarns 11 are made from a synthetic thermoplastic substance relatively impervious to soil or earth action, the preferred materials being any of the polyolefins, polypropylene and polyethylene. Filling yarns 12 are similarly made, and of course, soil degradable yarns 13 can also be placed in the fill direction, although their use in the warp is most economical and easier in construction when viewed in the light of present day weaving techniques.

Yarns 11 and 12 are preferably ribbon shaped to provide a "tighter" weave to minimize soil loss from the plant root ball before planting. Also, fabric strength is maximized with ribbons and moisture loss is minimal, while at the same time, when fabric 10 is provided with inventive strips or yarns 13, moisture can penetrate therethrough to the interior of the root ball. In addition, when the plant after balling with fabric 10 is stored above ground in nurseries or at the planting site fabric 10 will not deteriorate, hence can be readily transported after long periods without fear of losing the ball.

From the foregoing description it will be seen that the invention herein presented provides a woven fabric for covering plant roots and their soil complements, wherein the warp and filling yarns, relatively impervious to chemical or biological action of soil, include intervals of soil degradable yarns which decay in the soil and leave openings, or windows, through which plant roots pass to penetrate the surrounding soil.

While there has been shown a preferred embodiment of a woven root balling fabric for nursery plants having intervals of soil degradable yarns woven thereinto, it will be appreciated that other changes and modifications may be made therein without departing from the essential spirit of the invention. Thus, the yarns can be other than ribbon shaped, they can be monofilaments, multi-sectional yarns, or multifilaments, and the soil degradable yarns can be strings or cords of hemp, or animal hair and the like. Therefore the invention for which Letters Patent of the United States is desired is not subject to limitation except as defined in the claims annexed hereto.

What is claimed is:

1. A wrapper for root and earth balls of nursery plants and products comprising:

a woven fabric of thermoplastic, polymeric ribbon yarns, said polymeric yarns being highly resistant to soil or earth degradation when buried therein;

said ribbon yarns being closely woven in a weave configuration which renders said fabric capable of containing said earth or soil substantially without loss in storage above ground; and;

spaced apart sets of soil degradable yarns woven into said fabric for providing spaced apart openings when said degradable yarns deteriorate by chemical or biological action of said earth or soil in contact therewith.

2. The fabric of claim 1 wherein the polymeric ribbon yarns are polyolefin.

3. The fabric of claim 1 wherein the soil degradable yarns are made from a material selected from the group consisting of jute, paper, hemp, animal hair, cotton, rayon, and polyvinyl alcohol.

4. The fabric of claim 1 wherein the soil degradable yarns are made from a soil degradable synthetic plastic.

5. The fabric of claim 1 wherein the soil degradable yarns are in the warp and said intervals range from 1 inch to about 10 inches.

6. The fabric of claim 1 wherein the soil degradable yarns are made from a polyvinyl alcohol acrylate copolymer.

* * * * *